Nov. 30, 1926.
C. T. DICKEY
1,608,727
COATED RUBBER AND PROCESS FOR PRODUCING THE SAME
Filed April 4, 1925
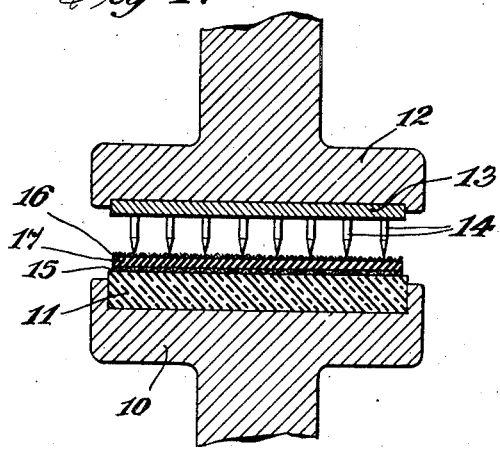
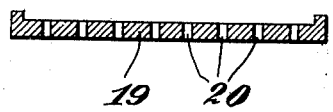
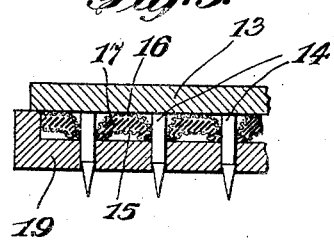
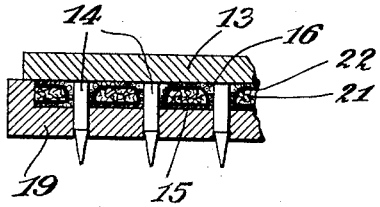
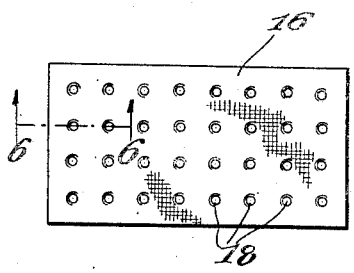
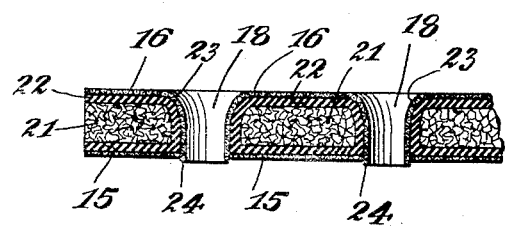
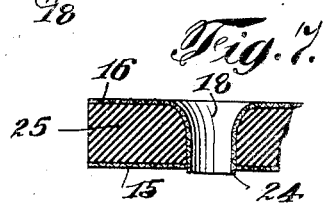
INVENTOR
Charles T. Dickey
BY
his ATTORNEY Patented Nov. 30, 1926.

1,608,727

UNITED STATES PATENT OFFICE.

CHARLES T. DICKEY, OF ELIZABETH, NEW JERSEY, ASSIGNOR TO RODIC RUBBER CO., OF GARWOOD, NEW JERSEY, A CORPORATION OF NEW JERSEY.

COATED RUBBER AND PROCESS FOR PRODUCING THE SAME.

Application filed April 4, 1925. Serial No. 20,767.

My invention relates to a process for the production of sponge rubber and refers particularly to sponge rubber carrying an outer covering of fabric and the process for producing the same.

It is frequently desirable to employ sponge rubber, especially in sheet form, covered with a fabric for purposes of strengthening the rubber or because of the advantages and comfort incident to the contact between a soft fabric, as silk, and the human body, and among the devices in which this combination is desirable and valuable are corsets and bandages.

The usually employed method of cementing, or gluing the fabric to the face of the rubber sheet is highly unsatisfactory, especially in those devices which are stretched during their employment, as the great difference between the elasticity of the rubber and of the fabric causes a rupture of the cementing means, thus producing a device in which the rubber is covered by a loose and non-attached fabric.

In many devices it is desirable that the rubber sheet be perforated, in order to allow of proper ventilation. These perforations have been generally produced by punching out, or cutting out, a plurality of portions of the sheet. It is evident that by this method of production, the fabric is also cut out, thus leaving a frayed edge around each perforation. It is also evident that the exposed walls of the perforations will consist of the cells of the sponge rubber, thus presenting an objectionable absorbent surface for the retention of moisture, perspiration, etc.

A consideration, therefore, of a sheet of sponge rubber carrying a cemented fabric covering with perforations therethrough as described above presents a device having highly disadvantageous and objectionable features, in that there will be a separation of the rubber and the fabric during a stretching process, that this will be greatly enhanced due to the frayed condition of the fabric, and that the walls of the perforations will collect and maintain moisture.

The device of my invention overcomes all of the above-mentioned, and other, objectionable features and presents a device in which the fabric and rubber are molded together during the vulcanization process, in which there is no cutting away of the fabric or rubber for the production of perforations and in which the walls of the perforations are fabric covered.

In the accompanying drawings illustrating one form of device suitable for the following of my process, similar parts are designated by similar numerals.

Figure 1 is a vertical diagrammatic section of a perforating device with the material placed for the perforating step.

Figure 2 is a vertical cross-section of a top mold.

Figure 3 is a vertical cross-section of the mold and material prior to vulcanization.

Figure 4 is a vertical cross-section of the mold and material after vulcanization.

Figure 5 is a top view of the finished material.

Figure 6 is an enlarged cross-section through the line 6—6 of Figure 5.

Figure 7 is a vertical cross-section of a modified form of the device of my invention.

The following of my process in connection with the particular device shown diagrammatically in the accompanying drawings is as follows:—

The hydraulic press member 10 carries a sheet of soft rubber 11 to act as a backing for the rubber to be perforated. The hydraulic press member 12 carries a removable plate 13 having a plurality of extended pins, or perforating members, 14—14, a portion of each pin being preferably cylindrical, as shown. The sheet material to be perforated is then placed upon the soft sponge backing 11, in the case illustrated, a lower fabric 15, an upper fabric 16 and an intermediate sheet of unvulcanized rubber 17. The two hydraulic members 10 and 12 are then moved toward each other, forcing the pins 14—14 through the fiber 16, rubber 17 and fiber 15. It is to be noted that the points of the pins will pass through the fiber 16 without breaking any of the threads except perhaps in a few isolated cases, and that the pins during their passage will carry the upper fiber 16 downwardly through the perforations 18—18 as shown in Figure 3, thus lining the sides of the perforations with fabric.

The hydraulic members 10 and 12 are then moved from each other, and the plate 13, with the pins 14—14 and the perforated fabric-rubber sheet, is removed from the hydraulic press.

A mold plate 19, having perforations 20—20 corresponding to the pins 14—14, is then placed upon the plate 13, as shown in Figure 3, the plate 13 and the mold plate 19, being so spaced from each other, as to allow the unvulcanized rubber 17 sufficient room for sponge rubber production.

The mold with its contents are then subjected to heating and vulcanizing during which process, sponge rubber 21 is formed, this sponge rubber mass being covered completely by a solid rubber coating, or cover, 22, which in turn is covered with the fabrics 15 and 16. It is to be noted that the fabrics 15 and 16 are vulcanized to the solid rubber 22 while in the positions they are to finally assume, that is while both exposed faces of the rubber sheet as well as the walls of the perforations are completely covered with the fabrics.

Experience has shown that frequently the upper edges of the perforations 23—23 are rounded, due to the compression maintained upon the sponge rubber during its formation by the less stretchable fabric, which thus acts as an auxiliary mold.

Further, bead rings 24—24 are frequently formed around the lower edges of the perforations.

An examination of Figure 6 shows that the sponge rubber mass 21 is completely enclosed in a layer of integral solid rubber 22, and that this in turn is enclosed in a layer of fabric vulcanized to the soft rubber cover and that all parts of the sponge rubber, including the perforations are covered and enclosed by these two fixedly attached layers of material.

For purposes of clearness of explanation, the several layers are shown in the accompanying drawings as being definitely distinct from each other, whereas, as a matter of fact, they intermingle to a certain degree thus producing a uniform exceedingly strong device.

It is further evident by a consideration of Figure 6, that the fabric is practically an integral part of the rubber and that any pulling or stretching given the device will not separate the fabric from the rubber, nor expose any rubber surface, nor tear out the perforations. The rubber elements of the device are thus greatly strengthened and supported.

It is evident that the rubber composition employed may be of a character to produce solid rubber, instead of sponge rubber as described above, in which case the finished product will have the appearance of that shown in Figure 7, the solid rubber 25 being completely covered by the fabrics 15 and 16.

I do not limit myself to the particular materials, or steps of procedure described, as these are given simply as a means for clearly describing my invention.

What I claim is:—

1. In the process of producing fabric covered perforated rubber, the steps which include bringing unvulcanized rubber and a fabric in face abutment with each other, passing pointed perforating means through the rubber and fabric, and vulcanizing and sponging the rubber while the perforating means are within the perforations.

2. In the process of producing fabric covered perforated rubber, the steps which include bringing unvulcanized rubber and a fabric in face abutment with each other, producing perforations through the rubber and fabric whereby fabric will be positioned upon the walls of the perforations and vulcanizing and sponging the rubber while the fabric is thus positioned upon the walls of the perforations.

3. In the process of producing fabric covered perforated rubber, the steps which include bringing unvulcanized rubber and a fabric in face abutment with each other, producing perforations through the rubber and fabric whereby fabric will be positioned upon the walls of the perforations and vulcanizing, molding and sponging the rubber while the fabric is thus positioned upon the walls of the perforations.

4. In the process of producing fabric covered perforated rubber, the steps which include bringing unvulcanized rubber and a fabric in face abutment with each other, passing pointed perforating means through the rubber and fabric, and vulcanizing, molding and sponging the rubber while the perforating means are within the perforations.

5. Perforated sponge rubber in which the walls of the perforations are covered by fabric vulcanized thereon.

6. Perforated sponge rubber the entire surface of which is covered by fabric vulcanized thereon.

7. A sheet of perforated sponge rubber comprising an inner mass of sponge rubber, a coating of solid rubber vulcanized to the sponge rubber and an exterior coating of fabric vulcanized to the solid rubber.

8. A sheet of perforated rubber comprising an inner mass of sponge rubber, a coating of solid rubber completely covering the sponge rubber and vulcanized thereto and an exterior coating of fabric completely covering the solid rubber and vulcanized thereto.

Signed at New York city in the county of New York and State of New York this 3rd day of April, 1925.

CHARLES T. DICKEY.